3,202,646
PRODUCTION OF CIS-POLYBUTADIENE IN AN AROMATIC-ALIPHATIC MIXED DILUENT
Floyd E. Naylor, Bartlesville, Okla., assignor to Phillips Petroleum Company, a corporation of Delaware
No Drawing. Filed Sept. 25, 1961, Ser. No. 140,192
9 Claims. (Cl. 260—94.3)

This invention relates to an improved process for preparing a polybutadiene containing a high percentage of cis 1,4-addition.

In recent years there has been conducted a great deal of research work directed toward the production of improved rubbery polymers. Great advances have recently been made in this field as a result of the discovery of new catalyst systems. These catalyst systems are often referred to as being "stereospecific" since they are capable of polymerizing monomers, particularly conjugated dienes, to a certain geometric configuration. One of the products which has attracted widespread attention because of its outstanding and superior properties is a polybutadiene containing a high percentage, e.g., at least 85 percent, of cis 1,4-addition. The physical properties of this high cis-polybutadiene are of such a nature that the polymer is particularly suitable for the fabrication of heavy duty tires and other articles for which conventional synthetic rubbers have heretofore been comparatively unsatisfactory. In one method for producing a high cis-polybutadiene, butadiene is polymerized in the presence of a catalyst system comprising as one component an organometal compound and an iodine-containing component. The present invention is concerned with an improvement in such a process for preparing a high cis-polybutadiene.

It is an object of this invention to provide an improved method for preparing a polybutadiene containing at least 85 percent, e.g., from 85 to 98 percent and higher, cis 1,4-addition.

Other and further objects and advantages of the invention will become apparent to those skilled in the art upon consideration of the accompanying disclosure.

As mentioned hereinbefore, it is known that a polybutadiene having a predominantly cis 1,4-structure can be prepared by polymerizing butadiene in the presence of a catalyst comprising an organometal compound as one component and containing an iodine-containing component. Although the polymerization reactions can be conducted in the presence of various types of hydrocarbon diluents, the conversion rate is usually higher with aromatic hydrocarbons than it is with aliphatic hydrocarbons. Furthermore, the polymers prepared in the presence of aromatic hydrocarbons have a higher cis-content than those prepared in aliphatic hydrocarbons. It has been found also that polymers prepared in the presence of aliphatic hydrocarbons frequently contain gel whereas the polymers prepared in an aromatic hydrocarbon medium are ordinarily gel-free. However, when aromatic hydrocarbons are employed, the polymer solutions have a tendency to be more viscous and agitation often becomes difficult unless the amount of diluent is quite large. The presence of an aliphatic hydrocarbon in the polymerization system on the other hand greatly reduces the viscosity of the mixture and agitation is facilitated. Although it would appear that the disadvantages arising in the use of the individual diluents might be overcome by employing a mixture of the materials, such has not turned out to be the case. The presence of an aliphatic hydrocarbon at the start of the reaction reduces both the polymerization rate and the cis-content of the polybutadiene product.

Broadly speaking, in a process for polymerizing 1,3-butadiene in the presence of a catalyst comprising as one component an organometal compound and an iodine-containing component, the present invention resides in the improvement comprising the steps of initiating the polymerization in the presence of a minor amount of an aromatic diluent and thereafter introducing an aliphatic hydrocarbon diluent, either in increments or continuously as the polymerization proceeds. At the conclusion of the polymerization, the aliphatic hydrocarbon diluent present is a major amount of the total diluent added. It has been discovered that if the polymerization is initiated in the presence of a small amount of an aromatic hydrocarbon and an aliphatic hydrocarbon is added in increments or continuously as the polymerization progresses, there is a marked reduction in viscosity of the reaction mixture with no substantial effect on the cis-content of the product. Also, when operating in this manner, a much smaller amount of total diluent than is generally required when an aromatic hydrocarbon is used as the sole diluent can be used to maintain the mixture in a fluid state. This is, of course, a very important economic advantage. Other advantages of the present process are that aliphatic hydrocarbons are easier to remove at the conclusion of the reaction and they are less expensive than aromatic hydrocarbons.

Examples of suitable aromatic hydrocarbons are benzene, toluene, xylene, ethylbenzene, and the like. It is to be understood that mixtures of the aromatic hydrocarbons can be utilized in the process. Aliphatic hydrocarbons which can be used as diluents in the process are preferably those containing from 3 to 12, inclusive, carbon atoms per molecule. Examples of such compounds include propane, n-butane, n-pentane, isopentane, n-hexane, isohexane, 2,2,4-trimethylpentane (isooctane), n-decane, n-dodecane, and the like. Cycloparaffins such as cyclopentane, cyclohexane, and methylcyclohexane can also be employed as well as mixtures of the various paraffins and cycloparaffins.

In conducting the process of this invention, the various ingredients used in the polymerization can be charged in any desired manner. The initial diluent used is an aromatic hydrocarbon, and the amount charged is generally in the range of 50 to 200 parts by weight per 100 parts of monomer. The smaller the amount of diluent added the shorter the time required for the mixture to become viscous. For example, with 50 parts of aromatic diluent, the reaction mixture sets up in a few minutes. The aliphatic hydrocarbon is introduced as required in order to maintain the mixture in a fluid state. While the addition of too large a quantity of the aliphatic hydrocarbon may jeopardize the cis-content of the product, the introduction of small amounts can be started as soon as one minute after initiation of the reaction. Usually the aliphatic hydrocarbon is added in 5 or more increments spaced at intervals throughout the polymerization. In many instances, the continuous slow addition of the aliphatic hydrocarbon until the end of the reaction is preferred. The ratio of aliphatic to aromatic hydrocarbons at the end of the reaction will depend upon the conversion and the amount of aromatic hydrocarbon used. The aliphatic hydrocarbon is present in a major amount, the weight ratio of aliphatic hydrocarbon to aromatic hydrocarbon being generally in the range of 2:1 to 5:1. However, it is to be understood that larger amounts, e.g., up to 20:1 or more, can be used. For economic reasons, it is usually desirable to operate with as small a quantity of diluent as possible.

The polybutadiene product of this invention contains at least 85 percent cis 1,4-addition, e.g., 85 to 98 percent and higher. A large number of different stereospecific catalysts can be employed in preparing this product. It is usually preferred to employ a catalyst which is selected from the group consisting of (1) a catalyst which forms on mixing components comprising an organometal compound having the formula $R_mM$, wherein R is alkyl, cycloalkyl, aryl, alkaryl, aralkyl, alkylcycloalkyl, arylcycloalkyl, cycloalkylalkyl, or cycloalkylaryl, M is aluminum, mercury, zinc, beryllium, cadmium, magnesium, sodium or potassium, and $m$ is equal to the valence of the metal M, and titanium tetraiodide, (2) a catalyst which forms on mixing components comprising an organometal compound having the formula $R_nM'$, wherein R is an organo radical as defined above, M' is aluminum, magnesium, lead, sodium or potassium, and $n$ is equal to the valence of the metal M', titanium tetrachloride and titanium tetraiodide, (3), a catalyst which forms on mixing components comprising an organometal compound having the formula $R_3Al$ or $R_2Mg$, wherein R is an organo radical as defined above, a compound having the formula $TiX_a$, wherein X is chlorine or bromine and $a$ is an integer from 2 to 4, inclusive, and elemental iodine, (4) a catalyst which forms on mixing components comprising an organometal compound having the formula $R_xM''$, wherein R is an organo radical as defined above, M'' is aluminum, gallium, indium, or thallium, and $x$ is equal to the valence of the metal M'', a titanium halide having the formula $TiX_4$, wherein X is chlorine or bromine, and an inorganic halide having the formula $M'''I_b$, wherein M''' is beryllium, zinc, cadmium, aluminum, gallium, indium, thallium, silicon, germanium, tin, lead, phosphorus, antimony, arsenic, and bismuth, and $b$ is an integer from 2 to 5, inclusive, and (5) a catalyst which forms on mixing components comprising an organo compound having the formula $R_xM''$, wherein R, M'', and $x$ are as defined above, titanium tetraiodide, and an inorganic halide having the formula $M^{iv}X_c$, wherein $M^{iv}$ is aluminum, gallium, indium, thallium, germanium, tin, lead, phosphorus, antimony, arsenic and bismuth, X is chlorine or bromine, and $c$ is an integer from 2 to 5, inclusive. The R radicals of the aforementioned formulas preferably contain up to and including 20 carbon atoms.

The following are examples of preferred catalyst systems which can be used to polymerize 1,3-butadiene to a cis 1,4-polybutadiene: triisobutylaluminum and titanium tetraiodide; triethylaluminum and titanium tetraiodide; triisobutylaluminum, titanium tetrachloride and titanium tetraiodide; triethylaluminum, titanium tetrachloride and titanium tetraiodide; diethylzinc and titanium tetraiodide; dibutylmercury and titanium tetraiodide; triisobutylaluminum, titanium tetrachloride and iodine; triethylaluminum, titanium tetrabromide and iodine; n-amylsodium and titanium tetraiodide; phenylsodium and titanium tetraiodide; n-butylpotassium, titanium tetrachloride and titanium tetraiodide; phenylpotassium and titanium tetraiodide; n-amylsodium, titanium tetrachloride and titanium tetraiodide; triphenylaluminum and titanium tetraiodide; triphenylaluminum, titanium tetraiodide and titanium tetrachloride; triphenylaluminum, titanium tetrachloride and iodine; tri-alpha-naphthylaluminum, titanium tetra chloride and iodine; tribenzylaluminum, titanium tetrabromide and iodine; diphenylzinc and titanium tetraiodide; di-2-tolylmercury and titanium tetraiodide; tricyclohexylaluminum, titanium tetrachloride and titanium tetraiodide; ethylcyclopentylzinc and titanium tetraiodide; tri-(3-isobutylcyclohexyl)aluminum and titanium tetraiodide; tetraethyllead, titanium tetrachloride and titanium tetraiodide; dimethylphenyllead, titanium tetrachloride and titanium tetraiodide; diphenylmagnesium and titanium tetraiodide; di-n-propylmagnesium, titanium tetrachloride and titanium tetraiodide; dimethylmagnesium, titanium tetrachloride and iodine; diphenylmagnesium, titanium tetrabromide and iodine; methylethylmagnesium, and titanium tetraiodide; dibutylberyllium and titanium tetraiodide; diethylcadmium and titanium tetraiodide; diisopropylcadmium and titanium tetraiodide; triisobutylaluminum, titanium tetrachloride and antimony triiodide; triisobutylaluminum, titanium tetrachloride and aluminum triiodide; triisobutylaluminum, titanium tetrabromide, and aluminum triiodide; triethylaluminum, titanium tetrachloride, and phosphorus triiodide; tri-n-dodecylaluminum, titanium tetrachloride, and tin tetraiodide; triethylgallium, titanium tetrabromide, and aluminum triiodide; tri-n-butylaluminum, titanium tetrachloride, and antimony triiodide; tricyclopentylaluminum, titanium tetrachloride, and silicon tetraiodide; triphenylaluminum, titanium tetrachloride, and gallium triiodide; triisobutylaluminum, titanium tetraiodide and tin tetrachloride; triisobutylaluminum, titanium tetraiodide and antimony trichloride; triisobutylaluminum, titanium tetraiodide and aluminum trichloride; triisobutylaluminum, titanium tetraiodide, and tin tetrabromide; triethylgallium, titanium tetraiodide, and aluminum tribromide; triethylaluminum, titanium tetraiodide, and arsenic trichloride; and tribenzylaluminum, titanium tetraiodide, and germanium tetrachloride.

The amount of the catalyst used in preparing the cis-polybutadiene product can vary over a rather wide range. The amount of the organometal used in the catalyst composition is usually in the range of 1.0 to 20 mols per mol of the halogen-containing component, i.e., a metal halide with or without a second metal halide or elemental iodine. When using an organoaluminum compound, a preferred mol ratio is from 2.5:1 to 12:1 of the organoaluminum compound to the halogen-containing component. When using organocompounds of other metals, a preferred mol ratio is from 1:1 to 2:1 of the organometal compound to the halogen-containing component. When using a catalyst comprising an organometal compound and more than one metal halide, e.g., titanium tetrachloride and titanium tetraiodide, titanium tetrachloride or tetrabromide and aluminum iodide, the mol ratio ratio of the tetrachloride or tetrabromide to the iodide is usually in the range of 0.05:1 to 5:1. With a catalyst system comprising an organo-metal compound, a titanium chloride or bromide and elemental iodine, the mol ratio of titanium halide to iodine is generally in the range of 10:1 to 0.25:1, preferably 3:1 to 0.25:1. The concentration of the total catalyst composition, i.e., organometal and halogen-containing component, is usually in the range of 0.01 to 10 weight percent, preferably in the range of 0.01 to 5 weight percent, based on the total amount of 1,3-butadiene charged to the reactor system.

The process for preparing cis-polybutadiene can be carried out at temperatures varying over a rather wide range, e.g., from $-100$ to $250°$ F. It is usually preferred to operate at a temperature in the range of $-30$ to $160°$ F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is inert with respect to the polymerization reaction.

Various materials are known to be detrimental to the catalyst employed in preparing the cis-polybutadiene. These materials include carbon dioxide, oxygen and water. It is usually desirable, therefore, that the butadiene and the diluent be freed of these materials as well as other materials which may tend to inactivate the catalyst. Furthermore, it is desirable to remove air and moisture from the reaction vessel in which the polymerization is to be conducted. Upon completion of the polymerization reaction, the reaction mixture is then treated to inactivate the catalyst and recover the rubbery polymer. A suitable method for accomplishing this result involves steam stripping the diluent from the polymer. In another suitable method, a catalyst inactivating material, such as an alcohol, is added to the mixture so as to inactivate the catalyst and cause precipitation of the polymer. The polymer is then separated from the alcohol and diluent by any suitable means, such as decantation or filtration. It has been found to be advantageous to add an antioxidant, such as phenyl-beta-naphthylamine, to the polymer solution prior to recovery of the polymer.

A more comprehensive understanding of the invention can be obtained by referring to the following illustrative examples, which are not intended, however, to be unduly limitative of the invention.

The microstructure of each cis-polybutadiene referred to in the examples was determined by dissolving a sample of the polymer in carbon disulfide so as to form a solution having 25 grams of polymer per liter of solution. The infrared spectrum of the solution (percent transmission) was then determined in a commercial infrared spectrophotometer.

The percent of the total unsaturation present as trans 1,4- was calculated according to the following equation and consistent units:

$$\epsilon = \frac{E}{tc}$$

where $\epsilon$=extinction coefficient (liters-mol$^{-1}$-centimeters$^{-1}$); $E$=extinction (log $I_0/I$); $t$=path length (centimeters); and $c$=concentration (mols double bond/liter). The extinction was determined at the 10.35 micron band and the extinction coefficient was 146 (liters-mols$^{-1}$-centimeters$^{-1}$).

The percent of the total unsaturation present as 1,2- (or vinyl) was calculated according to the above equation, using the 11.0 micron band and an extinction coefficient of 209 (liters-mols$^{-1}$-centimeters$^{-1}$).

The percent of the total unsaturation present as cis 1,4- was obtained by subtracting the trans 1,4- and 1,2-(vinyl) determined according to the above procedure from the theoretical unsaturation, assuming one double bond per each $C_4$ unit in the polymer.

EXAMPLE I

A run was conducted in which 1,3-butadiene was polymerized according to the present invention. The following recipe was employed:

Recipe

| | |
|---|---|
| 1,3-butadiene, parts by weight | 100 |
| Toluene, parts by weight | 90 |
| n-Heptane, parts by weight | 376 |
| Triisobutylaluminum, mhm.[1] | 1.8 |
| Titanium tetrachloride, mhm.[1] | 0.18 |
| Titanium tetraiodide, mhm.[1] | 0.18 |
| Temperature, °C. | 5 |
| Time, hours | 1 |

[1] Millimoles per 100 grams monomer.

Toluene was charged first to the reactor which was then purged with nitrogen. A toluene solution of triisobutylaluminum was then added, after which the butadiene was charged. The mixture was cooled at 5° C., and a mixture of the titanium halides dispersed in toluene was introduced. At intervals of 3, 7, 10, 15, and 20 minutes from the beginning of the reaction 34.2 parts by weight of n-heptane was added, followed by 68.4 parts after 40 minutes, and by 136.8 parts after 55 minutes. Two control runs were also conducted in which no heptane was used. Twelve hundred parts by weight of toluene was used in the first of these control runs and the polymerization time was one hour. Ninety parts by weight of toluene was used in the second run and the reaction was stopped after 3 minutes. The results of the runs are shown below in Table I.

TABLE I

| Run No. | Conversion, percent | Inherent viscosity | Microstructure, percent | | |
|---|---|---|---|---|---|
| | | | cis | trans | Vinyl |
| 1 | 50 | 2.09 | 94.7 | 1.9 | 3.4 |
| 2 (Control 1) | 60 | 2.66 | 96.1 | 1.0 | 2.9 |
| 3 (Control 2) | 17 | | | | |

The data show that polybutadiene with a high-cis content can be prepared in a system in which the major proportion of the diluent is an aliphatic hydrocarbon. The data also demonstrate that the polymerization can be carried out very satisfactorily at a low diluent level when an aliphatic hydrocarbon is used. Run 3 (Control 2) shows that 17 percent conversion had occurred at the end of 3 minutes, the time when the first increment of n-heptane was added in the run according to the invention. As illustrated by this example, a major portion of the polymerization was carried out in the presence of the aliphatic diluent.

EXAMPLE II

Two runs were conducted in which 1,3-butadiene was polymerized according to the following recipes:

Recipes

| | 1 | 2 |
|---|---|---|
| 1,3-butadiene, parts by weight | 100 | 100 |
| Toluene, parts by weight | 250 | 1,200 |
| n-Pentane, parts by weight | 567 | |
| Triisobutylaluminum, mhm | 1.7 | 1.8 |
| Titanium tetrachloride, mhm | 0.21 | 0.23 |
| Titanium tetraiodide, mhm | 0.21 | 0.23 |
| Temperature, °C | 5 | 5 |
| Time, hours | 3 | 3 |

The procedure was the same as described in Example I except for the addition of n-pentane in run 1. In this run, 31.5 parts by weight of n-pentane was added at intervals of 12, 15, 18, and 23 minutes from initiation of polymerization, and 63 parts by weight of n-petane was added thereafter at intervals of 28, 30, 33, 40, 55, 80, and 105 minutes. Run 2 was a control run in which 1200 parts of toluene was charged initially. No aliphatic hydrocarbon diluent was present in Run 2. The results of the two runs are shown in Table II.

TABLE II

| Run No. | Conversion, percent | Inherent viscosity | Microstructure, percent | | |
|---|---|---|---|---|---|
| | | | cis [1] | trans | Vinyl |
| 1 | 80 | 2.61 | 94.3 | 2.2 | 3.5 |
| 2 | 90 | 3.29 | 96.2 | 1.2 | 2.6 |

[1] By difference.

The foregoing data show that a high-cis polymer can be obtained in the presence of a diluent which is predominantly an aliphatic hydrocarbon. It is to be noted also that the amount of diluent used was much less than in the control run.

EXAMPLE III

Two runs were conducted in which 1,3-butadiene was polymerized, using benzene and n-hexane as diluents. The following recipe was employed:

Recipe

| | |
|---|---|
| 1,3-butadiene, parts by weight | 100 |
| Diluent, ml./100 g. monomer | 1000 |
| Triisobutylaluminum, mmoles | 2.5 |
| Titanium tetrachloride, mmoles | 0.357 |
| Titanium tetraiodide, mmoles | 0.357 |
| Temperature, °C. | 5 |
| Time, hours | 1 |

The diluent was charged to the reactor which was then purged with nitrogen. Triisobutylaluminum dissolved in toluene and the butadiene were thereafter added in that order. The mixture was then cooled to 5° C., and the titanium halide mixture dispersed in toluene was introduced. The results of the runs are shown below in Table III.

TABLE III

| Run No. | Diluent | Conversion, percent | Inherent viscosity |
|---|---|---|---|
| 1 | Benzene | 69 | 2.07 |
| 2 | n-Hexane | 14 | [1] 0.89 |

[1] Some gel present.

This example shows that the reaction rate was much faster and that the polymer was gel free when an aromatic hydrocarbon was used as the sole diluent.

EXAMPLE IV

A series of runs was conducted to show the effect on conversion of charging an aliphatic diluent (isopentane) in admixture with an aromatic diluent (toluene) prior to initiating polymerization. The following recipe was used:

Recipe

| | |
|---|---|
| 1,3-butadiene | 100 |
| Total diluent, parts by weight | 1000 |
| Triisobutylaluminum, mhm. | 3.0 |
| Titanium tetraiodide, mhm. | 0.75 |
| Temperature, ° C. | 5 |
| Time, hours | 2 |

All of the solvent was charged initially, after which the reactor was purged with nitrogen. Butadiene was then introduced, and the temperature was adjusted to 5° C. The catalyst, which had been preformed at 5° C., was then charged. The results of the runs are shown below in Table IV.

TABLE IV

| Run No. | Toluene, phm.[1] | Isopentane, phm.[1] | Conversion, Percent |
|---|---|---|---|
| 1 | 1,000 | 0 | 74 |
| 2 | 900 | 100 | 70 |
| 3 | 750 | 250 | 60 |
| 4 | 500 | 500 | 42 |

[1] Parts by weight per 100 parts monomer.

These data show the retardation in polymerization rate when the aliphatic hydrocarbon diluent is present prior to initiating the polymerization.

It will be apparent to those skilled in the art that variations and modifications of the present invention can be made in view of the foregoing disclosure. Such variations and modifications are believed to come clearly within the spirit and scope of the invention.

I claim:

1. In a process for polymerizing 1,3-butadiene in the presence of an iodine-containing catalyst which polymerizes butadiene to a polymer containing at least 85 percent cis 1,4-addition and which forms on mixing components comprising an organoaluminum compound and a titanium halide, the improvement which comprises charging to a polymerization zone said catalyst, 1,3-butadiene and an aromatic hydrocarbon diluent; after polymerization reaction is initiated in the substantial absence of aliphatic hydrocarbon diluent, continuously introducing into said polymerization zone an aliphatic hydrocarbon diluent until termination of the polymerization reaction, the amount of aliphatic hydrocarbon diluent added being a major proportion of the total diluent and a major portion of the polymerization being performed in the presence of said aliphatic diluent; and recovering the polymer of 1,3-butadiene so produced.

2. The process according to claim 1 in which the amount of aromatic hydrocarbon charged is in the range of 50 to 200 parts by weight per 100 parts of 1,3-butadiene, and the weight ratio of total aliphatic hydrocarbon charged to aromatic hydrocarbon is in the range of 2:1 to 5:1.

3. In a process for polymerizing 1,3-butadiene in the presence of an iodine-containing catalyst which polymerizes butadiene to a polymer containing at least 85 percent cis 1,4-addition and which forms on mixing components comprising an organoaluminum compound and a titanium halide, the improvement which comprises charging to a polymerization zone said catalyst, 1,3-butadiene and an aromatic hydrocarbon diluent; after polymerization reaction is initiated in the substantial absence of aliphatic hydrocarbon diluent, introducing into said polymerization zone an aliphatic hydrocarbon diluent, said diluent being added in increments at spaced intervals until termination of the polymerization reaction, the amount of said diluent added being a major proportion of the total diluent and a major portion of the polymerization being performed in the presence of said aliphatic diluent; and recovering the polymer of 1,3-butadiene so produced.

4. The process according to claim 3 in which the amount of aromatic hydrocarbon charged is in the range of 50 to 200 parts by weight per 100 parts of 1,3-butadiene, and the weight ratio of total aliphatic hydrocarbon charged to aromatic hydrocarbon is in the range of 2:1 to 5:1.

5. The process according to claim 4 in which said aromatic hydrocarbon diluent is toluene and said aliphatic hydrocarbon diluent is n-heptane.

6. The process according to claim 4 in which said aromatic hydrocarbon diluent is toluene and said aliphatic hydrocarbon diluent is n-pentane.

7. The process according to claim 4 in which said aromatic hydrocarbon diluent is benzene and said aliphatic hydrocarbon diluent is n-heptane.

8. The process according to claim 4 in which said aromatic hydrocarbon diluent is benzene and said aliphatic hydrocarbon diluent is n-pentane.

9. The process according to claim 4 in which said aromatic hydrocarbon diluent is toluene and said aliphatic hydrocarbon diluent is n-hexane.

References Cited by the Examiner

FOREIGN PATENTS 551,851 4/57 Belgium.

JOSEPH L. SCHOFER, Primary Examiner.

MORRIS LIEBMAN, WILLIAM H. SHORT, Examiners.